United States Patent
Vijayaraghavan et al.

(10) Patent No.: US 10,216,845 B2
(45) Date of Patent: *Feb. 26, 2019

(54) METHOD AND APPARATUS FOR PREDICTIVE ENRICHMENT OF SEARCH IN AN ENTERPRISE

(71) Applicant: [24]7.AI, INC., San Jose, CA (US)

(72) Inventors: Ravi Vijayaraghavan, Bangalore (IN); Gangadharan Kumar, Bangalore (IN)

(73) Assignee: [24]7 .AI, INC., San Jose, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 14/704,869

(22) Filed: May 5, 2015

(65) Prior Publication Data

US 2015/0234925 A1    Aug. 20, 2015

Related U.S. Application Data

(63) Continuation of application No. 13/443,782, filed on Apr. 10, 2012, now Pat. No. 9,058,362.

(60) Provisional application No. 61/511,893, filed on Jul. 26, 2011.

(51) Int. Cl.
*G06F 17/30* (2006.01)
*G06N 7/00* (2006.01)

(52) U.S. Cl.
CPC .. *G06F 17/30864* (2013.01); *G06F 17/30554* (2013.01); *G06N 7/005* (2013.01)

(58) Field of Classification Search
CPC ......... G06F 17/30864; G06F 17/30867; G06F 17/30991; G06F 17/30427; G06F 17/30672
See application file for complete search history.

(56) References Cited

U.S. PATENT DOCUMENTS

| | | | |
|---|---|---|---|
| 5,848,396 A | 12/1998 | Gerace | |
| 6,615,258 B1 | 9/2003 | Barry et al. | |
| 7,266,821 B2 | 9/2007 | Polizzi et al. | |
| 7,730,056 B2 | 6/2010 | Kaiser et al. | |
| 7,953,859 B1 * | 5/2011 | Kiefhaber | H04M 3/5175 370/266 |
| 8,938,063 B1 * | 1/2015 | Hackbarth | G06Q 10/00 379/265.03 |
| 2001/0047332 A1 * | 11/2001 | Gonen-Friedman | G06Q 20/102 705/40 |
| 2005/0256971 A1 * | 11/2005 | Colrain | G06F 9/505 709/238 |
| 2006/0136411 A1 | 6/2006 | Meyerzon et al. | |

(Continued)

OTHER PUBLICATIONS

Extended European Search Report dated Aug. 5, 2015, for European Patent Application No. 12817478.6, 7 pages.

*Primary Examiner* — Yuk Ting Choi
(74) *Attorney, Agent, or Firm* — Perkins Coie LLP

(57) ABSTRACT

With regard to searches and, more particularly, to searches performed on information repositories belonging to an enterprise, a centralized management system is used by the enterprise to manage the predictive search experience for users. A system offers a rich resolution experience to the end users based on user intent as determined from a variety of mechanisms, such as keywords, end user journey, clustered journey, etc. Also disclosed herein is a system that derives and offers various suggestions to end users to help them accomplish their objectives.

15 Claims, 3 Drawing Sheets

(56) References Cited

U.S. PATENT DOCUMENTS

| | | |
|---|---|---|
| 2006/0165066 A1* | 7/2006 | Campbell ........... H04M 3/5125 370/352 |
| 2006/0253427 A1 | 11/2006 | Wu et al. |
| 2007/0053513 A1 | 3/2007 | Hoffberg |
| 2007/0192166 A1* | 8/2007 | Van Luchene .... G06F 17/30646 705/14.54 |
| 2008/0091670 A1* | 4/2008 | Ismalon ............. G06F 17/3064 707/999.005 |
| 2009/0106233 A1* | 4/2009 | Veenstra ........... G06F 17/30448 707/999.003 |
| 2009/0171704 A1* | 7/2009 | Bobak ................... G06Q 10/06 705/7.12 |
| 2009/0187540 A1 | 7/2009 | Richardson et al. |
| 2009/0222313 A1* | 9/2009 | Kannan ................. G06Q 30/02 705/7.31 |
| 2010/0057687 A1 | 3/2010 | Shen et al. |
| 2010/0114938 A1 | 5/2010 | Weng |
| 2010/0138282 A1 | 6/2010 | Kannan et al. |
| 2011/0112897 A1* | 5/2011 | Tietzen ................. G06Q 30/02 705/14.25 |
| 2011/0179025 A1 | 7/2011 | Chuang |
| 2011/0208730 A1* | 8/2011 | Jiang ................ G06F 17/30864 707/727 |
| 2012/0158685 A1 | 6/2012 | White et al. |

* cited by examiner

METHOD AND APPARATUS FOR PREDICTIVE ENRICHMENT OF SEARCH IN AN ENTERPRISE

CONTINUATION APPLICATION

This application is a continuation of U.S. patent application Ser. No. 13/443,782, filed Apr. 10, 2012, which claims benefit of U.S. provisional patent application Ser. No. 61/511,893, filed Jul. 26, 2011, which is incorporated herein in its entirety by this reference thereto.

TECHNICAL FIELD

The invention relates to searches. More particularly, the invention relates to searches performed on information repositories belonging to an enterprise.

BACKGROUND

Currently, when a user within an enterprise, e.g. a customer of the enterprise or a user working in the enterprise, requires information (for example, a customer looking to resolve some issues with a company's product or service that was purchased from the company), the user (or customer) may have a variety of sources available to him, including other users, online repositories of knowledge, and so on. The online repositories may be accessed by the user via the website of the enterprise or any other suitable means, such as, for example, through various channels or devices. However, the online repositories comprise huge amounts of information and it takes a considerable amount of time for the user to browse, filter, and access the required information before the user can actually access the required information.

Search capability is available to the user to enable him to search the repository for the information required. However, searches using such capability are generally performed based on keywords on records in the repositories that may or may not have been indexed. During the process of indexing, information (which may be in the form of keywords, strings, author, date of creation, and so on) is extracted from the repositories and the information is stored in catalogs of indexes. The catalogs are then searched to obtain the relevant records when the user enters a query.

However, current searches do not consider, and are not customized to the attributes of the user; his past history, e.g. real history, such as past touch points, and current session history; user preferences; and so on. This may result in the user viewing a lot of results which are relevant according to the search query entered, but that are not useful because they do not contain the information required. For example, the user may have been searching for billing of post paid customers and may have entered a search term 'billing.' In this example, the results returned may be related to billing of both prepaid customers and post paid customers. Here, the user must filter the results manually to view the information related to billing of post paid customers. This manual filtration of results is a cumbersome and time consuming process and often meets with only limited success.

SUMMARY OF THE INVENTION

Embodiments of the invention herein disclose a centralized management system that can be used by enterprises to manage a predictive search experience for users. Embodiments herein disclose a system that offers a rich resolution experience to end users based upon a determination of the user's intent as derived from a variety of mechanisms, such as keywords, user journey, clustered journey, etc. Also disclosed herein is a system that derives and offers various suggestions to the end users that help them accomplish their objectives.

DETAILED DESCRIPTION OF EMBODIMENTS

Embodiments of the invention herein disclose a centralized management system that can be used by enterprises to manage a predictive search experience for users. Embodiments herein disclose a system that offers a rich resolution experience to end users based upon a determination of the user's intent as derived from a variety of mechanisms, such as keywords, user journey, clustered journey, etc. Also disclosed herein is a system that derives and offers various suggestions to the end users that help them accomplish their objectives.

In an embodiment of the invention, a customer begins a search for information related to an issue, concern, product, etc. The system examines the search terms typed by the customer, historical attributes of the customer, historical journey attributes of the customer, and current journey attributes of the customer. The system then makes a prediction of any of the customer's intent, query category, and issue category. The system contains a set of knowledge articles under each of the customer intent and query and issue categories. Based upon the results of the system's prediction, relevant knowledge articles related to the customer's intent and/or query and/or issue categories are selected and returned to the customer as the results for the customer's search. In an embodiment, the order in which the knowledge articles are returned is determined based on the relative clickthrough success of such articles over time in similar queries.

Figure 1:
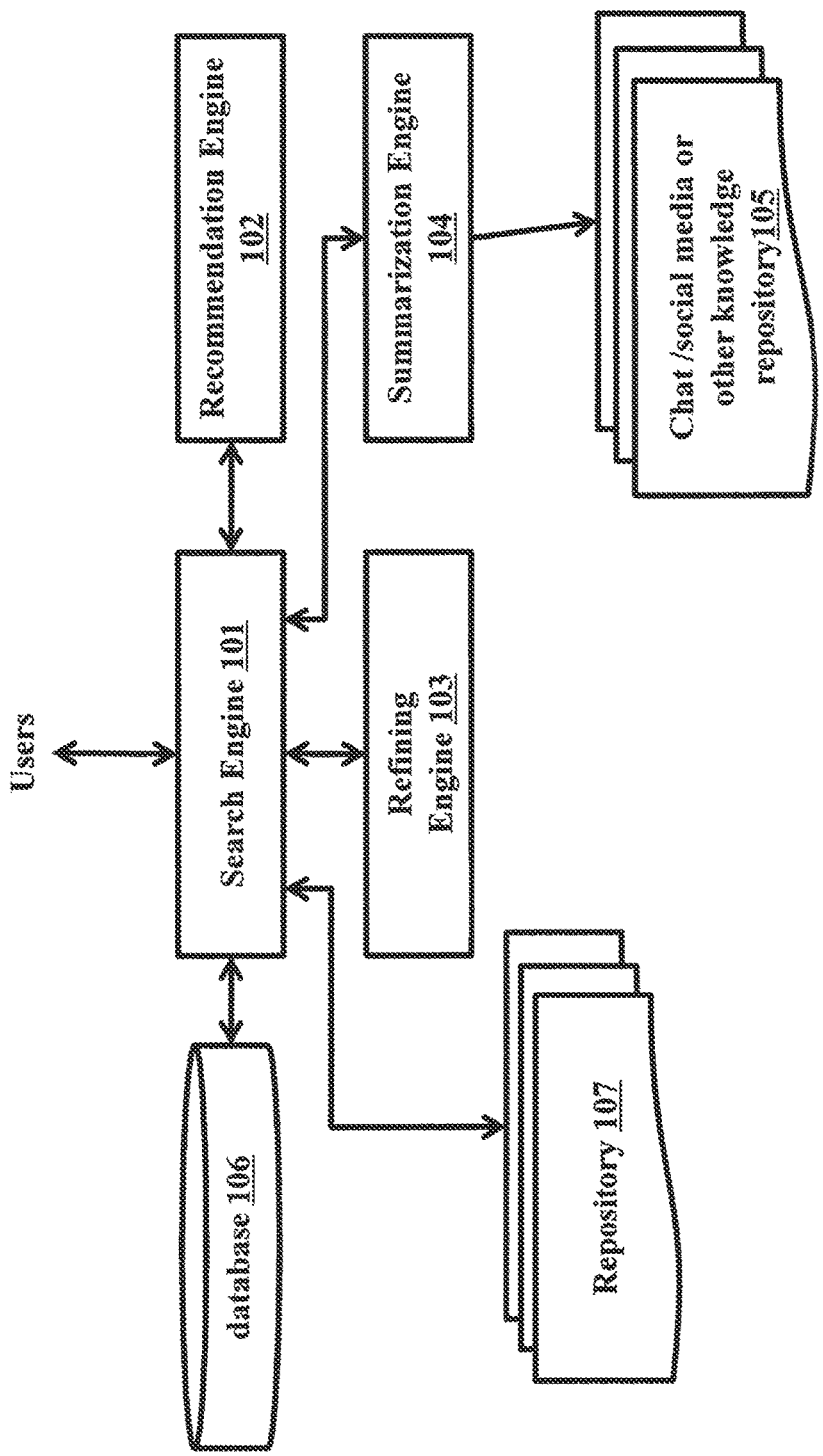
FIG. 1 is a block schematic diagram that depicts a system that enables search in an enterprise according to the invention.

FIG. 1 is a block schematic diagram that depicts a system in accordance with an embodiment of the invention that comprises a search engine 101, a recommendation engine 102, a refining engine 103, a summarization engine 104, a knowledge repository 105, a database 106, and at least one repository 107.

The search engine 101 enables at least one other user to perform searches on at least one repository 107 available within an enterprise. The users may interact with the search engine 101 using a suitable interface, which may be accessed using a web site, an application available to the user, or any other suitable means.

On receiving a user search query from a user, the search engine 101 identifies the user and fetches information related to the user from the database 106. The information fetched from the database 106 comprises, for example, prior search words and results for searches performed by the user and other users who may be associated with the user; the trail of the user in the enterprise domain; the trail of the user prior to visiting the enterprise domain; text mined chat transcripts; meta data of the chats, e.g. average handle time, average response time, disposition, standard deviation of response times, number of customer lines, number of agent lines, etc.; text mined voice transcripts; information present in social networks; information related to the user, including attributes from the CRM system about the users, for example, in the case of a telecom company, the user information could involve attributes such as billing data, past bills, mobile plan, etc.; data from the enterprise pages; any forms filled by the user; and so on. The information fetched from the database 106 also depends on the current search query. The search engine 101 sends the information fetched from the database 106 to the recommendation engine 102.

In an embodiment that concerns customer service queries, the recommendation engine 102 probabilistically predicts the customer issue type given the above mentioned attributes of the user and the search query from the user. Probability for a given issue type/resolution need is determined as a function of, for example, customer attributes from CRM and other sources, history of prior contacts through all channels, behavior on the website, behavior on the web before coming into the website, e.g. search engine, and other relevant parameters. The recommendation engine 102 may use one of several algorithms, such as Naïve Bayes, logistic regression, and/or support vector machines (SVM) to predict the probability that a given issue is the issue of interest for the user.

The recommendation engine 102 sends the predicted search query to the search engine 101. The predicted search query may be in the form of a key word or key string.

The search engine 101 also checks if the predicted search query provided by the recommendation engine 102 needs further refining. The decision for further refining of the recommendation may be made by the user who has entered the search query. The decision for further refining the query may also be automatically decided by the search engine 101 based on a plurality of factors, where the factors comprise, e.g. the number of results that may be returned by the predicted search query, and so on. If further refinement is to be done, the search engine 101 informs the refinement engine 103.

In another embodiment, the refinement engine 103 checks if the predicted search query provided by the recommendation engine 102 needs further refining. The refinement engine 103, for example, based on the predicted search query from the recommendation engine 102, the search query entered by the user, and/or other information provided by the search engine 101, prepares a list of questions, which is sent to the user. On receiving a response from the user, the refinement engine 103 further refines the predicted search query and sends the search query to the search engine 101.

On receiving the refined search result, the search engine 101 fetches the appropriate results from the repositories 107 and displays the results to the user. The results may be displayed in a web page, an application, a widget, or by any other suitable means. The results may also comprise a section where the best result, as per the search engine 101, is highlighted; or the results may be returned to the user in the form of two or more articles that are listed in an order that is determined based upon such factors as the relative clickthrough for such articles in previous, similar searches. The best result, as per the search engine 101, may also be shown to the user in a pop up widget.

The search engine 101 monitors the response of the user to the search results displayed to the user. For example, the search engine 101 may track the clicks made by the user, the information viewed by the user, the amount of time the user spends on each piece of information, and so on. The responses of the user are stored in the database 106 and are used to improve searches made by the user and other users in the future.

The search engine 101 may also request that the user take a survey on the efficacy of the search results. The information provided by the user, if he fills the survey, may be used by the search engine 101 to improve searches made by the user and other users in the future.

The summarization engine 104 fetches chat, voice transcripts from conversations with the customers, and social media/blog/forum transcripts from the knowledge store/ repository 105 and text mines this corpus and provides a summary content that is used to build a knowledge repository automatically and at scale. Different algorithms can be used for summarization [examples in academic literature to be given]. The transcripts are filtered using structured attributes, such as highest recommendation score, highest customer satisfaction score (CSAT), and highest resolution score for a given issue type. These transcripts are then summarized and stored in the database 106 using Natural Language Processing based summarization techniques.

Figure 2:
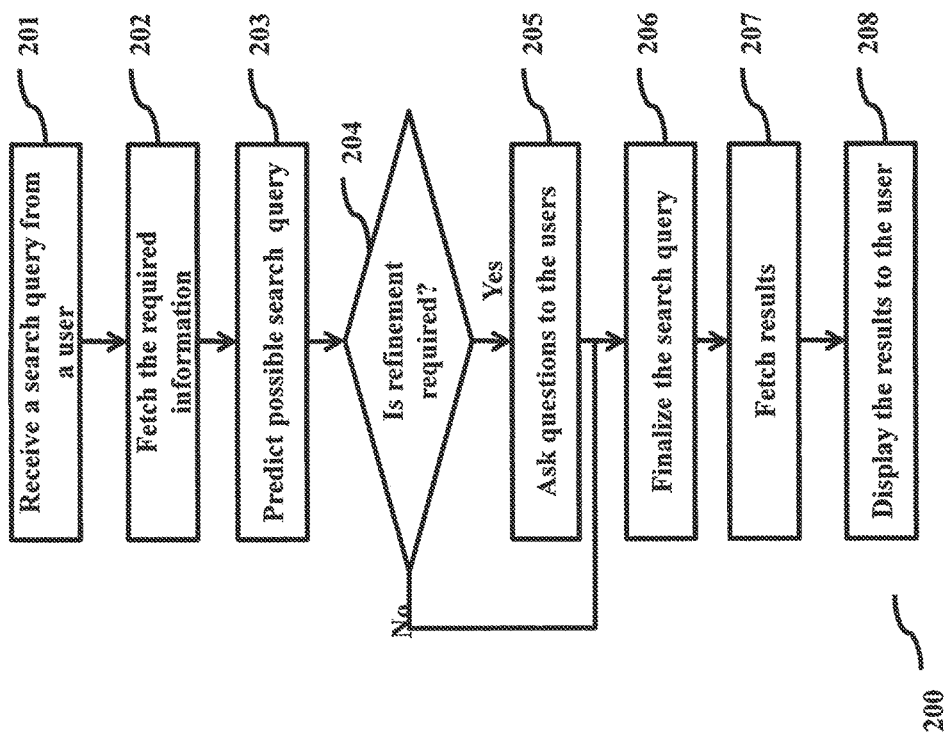
FIG. 2 is a flowchart that depicts a method for enabling search in an enterprise according to the invention.

FIG. 2 is a flowchart that depicts a method in accordance with an embodiment of the invention in which the search engine 101 receives (201) a user search query from the user and fetches (202) relevant information from the database 106. The information fetched from the database 106 may comprise, for example, prior search words and results performed by the user and other users who may be associated with the user; the trail of the user in the enterprise domain; the trail of the user prior to visiting the enterprise domain; text mined chat transcripts; meta data of the chats; text mined voice transcripts; information present in social networks; information related to the user, including name, designation within the enterprise, roles and responsibilities of the user, and so on; data from the enterprise pages; any forms filled by the user; and so on.

The search engine 101 sends the information fetched from the database 106 to the recommendation engine 102, which probabilistically predicts (203) the issue type given the above mentioned attributes of the user and the search query from the user. The recommendation engine 102 may use one of several algorithms, such as Naïve Bayes, logistic regression, and/or support vector machines (SVM) to predict the probability of a given issue being the issue of interest for the user.

The recommendation engine 102 sends the predicted search query to the search engine 101. The predicted search query may be in the form of a key word or key string.

The search engine 101 also checks (204) if the predicted search query provided by the recommendation engine 102 needs further refining. If further refinement is to be done, the search engine 101 informs the refinement engine 103 and the refinement engine 103, based on, for example, the predicted search query from the recommendation engine 102, the search query entered by the user, and other information provided by the search engine 101, and then asks (205) questions of the user. On receiving a response from the user, the refinement engine 103 finalizes (206) the search query and sends the final search query to the search engine 101.

If refinement is not required, the search engine 101 finalizes (206) the predicted search query as the search query. The search engine 101 then fetches (207) the appropriate results from the repositories 107 and displays (208) the results to the user. The results may be displayed in a web page, an application, a widget, or by any other suitable means.

The various actions in method 200 may be performed in the order presented, in a different order, or simultaneously. Further, in some embodiments, some actions listed in FIG. 2 may be omitted.

While the search itself is a signal for the user need, the search query alone cannot predict intent as effectively as such intent can be predicted by embodiments as disclosed herein. Consider an example, where a customer of a telephone company wants to search on configuring mail service on a phone that he has recently bought. The customer goes to the website of the company and types in a search query which enables him to bring up the page from the website which has information on how to configure emails on the model of phone that he bought.

However, the search query might be a very generic query, such as "configuring email on a phone." The search engine has access to the profile of the customer, including data on the phone used by him and/or any mobile phone purchases made by him. Based on this information about the customer, the search engine predicts that the customer is searching on how to configure email on the specific make and model of phone and further refines the search query by making it more specific, such as "configuring email on XXX 123," where XXX 123 is the make and model of the phone bought by the customer.

The search engine then performs a search based on the refined search query and presents the results to the customer. The search engine may also present the specific page with the steps to be performed for configuring the mobile phone in a separate widget. The search engine may also highlight the web page with the steps to be performed for configuring the mobile phone. Thus, the user is presented with only those results that are relevant to that specific user for that query.

In another example, consider that a customer of a cable television company is looking for costs of available channel packages which have all of the sports channels. The customer may go to the website of the channel and conduct a search for the information. The search engine has access to the past history of the customer including, for example, searches done by the customer, previous queries asked by the customer using chats, phone calls, or social network media and, based on the available information, predicts that this customer is interested in packages which offer all the sports channels. The search engine modifies the search query to reflect the requirements of the customer and performs the search for costs of channel packages which have all sports channels. The search engine presents the search results to the customer.

In another example, consider a customer who is looking for information related to the third service of his car. The customer wants to get information related to the third service, including the cost of the third service, the consumables to be services/replaced during this service, and so on. The customer goes to the website of the car manufacturer and searches for information related to the third service. The search engine has access to the customer information, including the type of car purchased by the customer, the number of services which have been completed, two in this case. Based on this information, the search engine predicts that the customer is looking for information related to the third service and performs the search for information related to the third service. The search engine then presents the search results to the customer.

Computer Implementation

Figure 3:
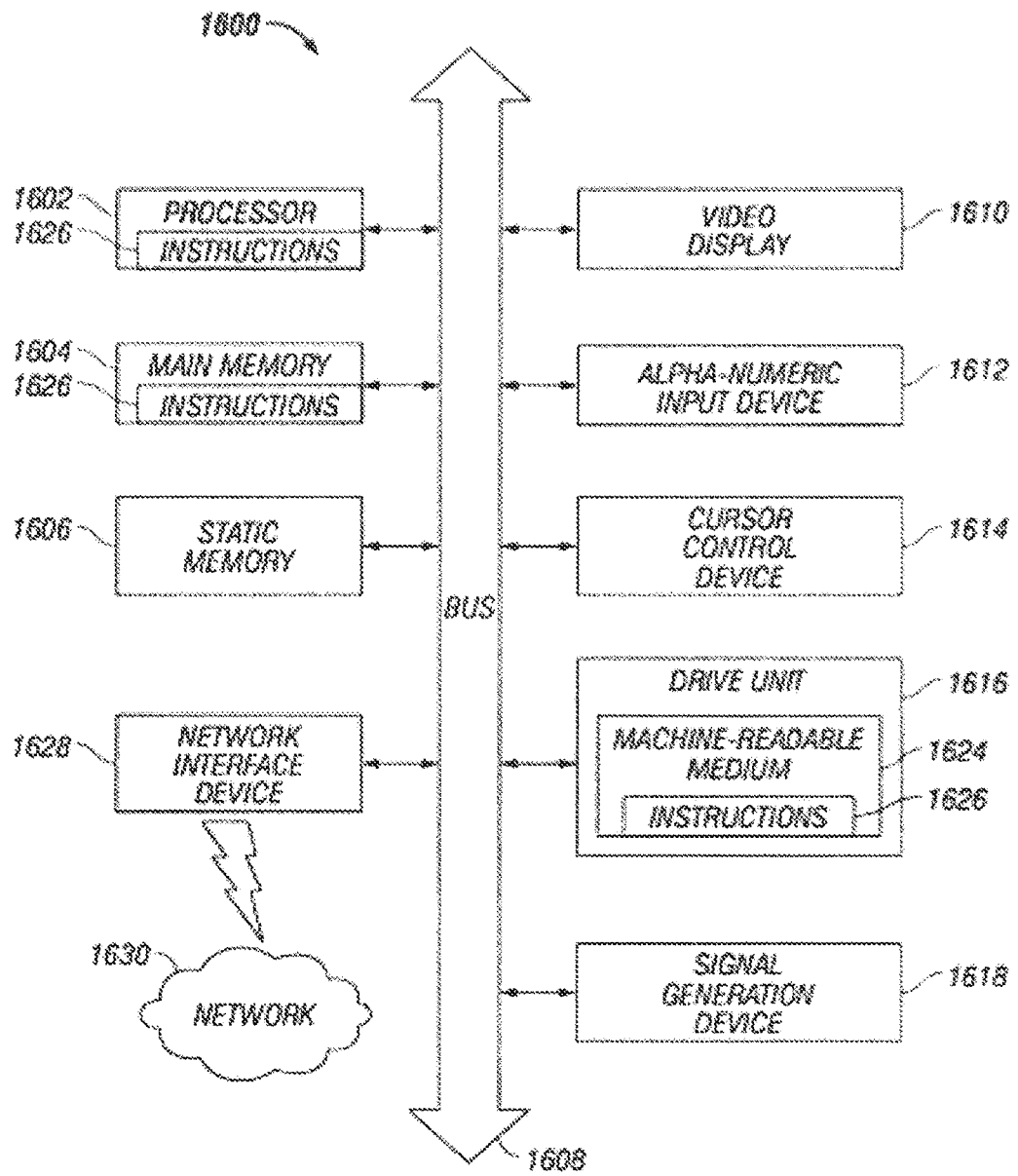
FIG. 3 is a block schematic diagram of a machine in the exemplary form of a computer system within which a set of instructions for causing the machine to perform any one of the foregoing methodologies may be executed.

FIG. 3 is a block schematic diagram of a machine in the exemplary form of a computer system 1600 within which a set of instructions for causing the machine to perform any one of the foregoing methodologies may be executed. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g., a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to preferred embodiments, one skilled in the art will readily appreciate that other applications may be substituted for those set forth herein without departing from the spirit and scope of the invention. Accordingly, the invention should only be limited by the Claims included below.

The invention claimed is:

1. A computer implemented enterprise search apparatus, comprising:

a recommendation engine, in communication with a search engine and a database, receiving information from the database in response to a customer query entered into the search engine, where the information received from the database includes:
information related to the customer, and metadata of chats of the customer;
a refinement engine configured to refine the customer query based customer responses to a list of questions;
a summarization engine configured to fetch chat and voice transcripts from conversations with the one or more customers, and social media, blog, forum transcripts from said one or more repositories; and
a processor executing the refinement, summarization and recommendation engines;
said recommendation engine probabilistically predicting a customer issue type based upon both of the information related to the customer fetched from the database and the customer query;
wherein said summarization engine is configured to text mine transcripts of chats with the customer and generate a summary content using Natural Language Processing based summarization techniques, the summary content is automatically applied to a knowledge repository across all customers, wherein the knowledge repository is filtered using structured attributes comprising any of highest recommendation score, highest customer satisfaction score (CSAT), and highest resolution score for a given issue type, the knowledge repository used by the search engine in responding to queries;
said recommendation engine executing an algorithm for predicting a probability that a given issue is an issue of interest for the customer and returning results to the customer related to said issue of interest; and wherein, upon receiving a response from the customer, said refinement engine further refines the customer query and sends said refined search query to said search engine.

2. The apparatus of claim 1, wherein said search engine checks if the predicted search results provided by the recommendation engine needs further refining.

3. The apparatus of claim 2, wherein a decision for further refining of the search results provided by the recommendation engine is made by the customer who has entered the search query;
wherein, if further refinement is to be done, said search engine informs a refinement engine.

4. The apparatus of claim 2, wherein a decision for further refining the search results provided by the recommendation engine is automatically decided by the search engine based on a plurality of factors;
wherein, if further refinement is to be done, said search engine informs a refinement engine.

5. The apparatus of claim 4, wherein said factors comprise a number of results that are returned by the search query.

6. The apparatus of claim 1, wherein upon receiving said refined search query, said search engine fetches corresponding results from said one or more repositories and displays said results to the customer.

7. The apparatus of claim 1, wherein said search engine monitors customer responses to search results displayed to the customer by tracking any of clicks made by the customer, information viewed by the customer, and an amount of time the customer spends on each piece of information;
wherein responses of the customer are stored in said database and are used to improve searches made by the customer and/or other customers in the future.

8. The apparatus of claim 1, wherein said search engine requests that the customer take a survey on the efficacy of the search results;
wherein any information provided by the customer is used by the search engine to improve searches made by the customer or other customers in the future.

9. The apparatus of claim 1 said predicted search results comprising any of a key word or key string.

10. The apparatus of claim 1, said algorithm comprising any of Naïve Bayes, logistic regression, and/or support vector machines (SVM) algorithms.

11. The apparatus of claim 1, said customer interface comprising any of a web site and an application available to the customer.

12. A computer implemented method for enterprise searching, comprising:
providing a processor implemented recommendation engine communicating with a search engine and a database;
providing a processor implemented refinement engine communicating with the search engine and the recommendation engine;
providing a processor implemented summarization engine communicatively coupled to the search engine, the summarization engine configured to fetch chat and voice transcripts from conversations with the one or more customers, and social median, blog, forum transcripts from said one or more repositories;
receiving at the processor implemented recommendation engine information from the database in response to a customer query entered into the search engine, where the information received from the database includes:
information related to the customer, and meta data of chats of the customer; probabilistically predicting at said recommendation engine an issue type given the information related to the customer fetched from the database and the search query from the customer;
executing an algorithm at said recommendation engine for predicting a probability that a given issue is an issue of interest for the customer and returning results to the customer related to said issue of interest; and
said recommendation engine sending a resulting predicted search query to the refinement engine;
refining the predicted search query into a refined search query based customer responses to a list of questions;
sending said refined search query to said search engine; and
said summarization engine generating a summary content using Natural Language Processing based summarization techniques using text mined transcripts of chats with the customer, wherein the summary content is automatically applied to a knowledge repository across all customers, wherein the knowledge repository is filtered using structured attributes comprising any of highest recommendation score, highest customer satisfaction score (CSAT), and highest resolution score for a given issue type, the knowledge repository used by the search engine in responding to queries.

13. The method of claim 12, wherein said predicted search results is in the form of any of a key word or key string.

14. The method of claim 12, said recommendation engine using any of Naïve Bayes, logistic regression, and/or support vector machines (SVM) algorithms to predict the probability of a given issue being the issue of interest for the customer.

15. The method of claim 12, wherein if refinement is not required, said search engine finalizing said predicted search results; and said search engine fetching appropriate results from said repositories and displaying the results to the customer.

\* \* \* \* \*

UNITED STATES PATENT AND TRADEMARK OFFICE
CERTIFICATE OF CORRECTION

PATENT NO. : 10,216,845 B2
APPLICATION NO. : 14/704869
DATED : February 26, 2019
INVENTOR(S) : Ravi Vijayaraghavan and Gangadharan Kumar Page 1 of 1

It is certified that error appears in the above-identified patent and that said Letters Patent is hereby corrected as shown below:

On the Title Page

Item (73) Assignee name is incorrectly listed as: [24]7 .AI, INC.
Please change the same to read: [24]7.AI, INC.

Signed and Sealed this
Twenty-third Day of July, 2019

Andrei Iancu
*Director of the United States Patent and Trademark Office*